US011120057B1

(12) United States Patent
McNabney et al.

(10) Patent No.: US 11,120,057 B1
(45) Date of Patent: Sep. 14, 2021

(54) METADATA INDEXING

(71) Applicant: MicroStrategy Incorporated, Vienna, VA (US)

(72) Inventors: Chris McNabney, Reston, VA (US); Siamak Ziraknejad, Reston, VA (US); Dongping Liang, Herndon, VA (US); Jose Nocedal, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 224 days.

(21) Appl. No.: 15/955,492

(22) Filed: Apr. 17, 2018

Related U.S. Application Data

(60) Provisional application No. 62/486,269, filed on Apr. 17, 2017.

(51) Int. Cl.
*G06F 16/31* (2019.01)
*G06F 16/38* (2019.01)
*G06F 16/93* (2019.01)

(52) U.S. Cl.
CPC .......... *G06F 16/313* (2019.01); *G06F 16/316* (2019.01); *G06F 16/38* (2019.01); *G06F 16/93* (2019.01)

(58) Field of Classification Search
CPC combination set(s) only.
See application file for complete search history.

(56) References Cited

U.S. PATENT DOCUMENTS

| | | | |
|---|---|---|---|
| 6,718,324 B2 | 4/2004 | Edlund et al. |
| 7,219,154 B2 | 5/2007 | Blakley, III et al. |
| 7,401,235 B2 | 7/2008 | Mowers et al. |
| 7,421,421 B2 | 9/2008 | Newbold et al. |
| 7,860,871 B2 | 12/2010 | Ramer et al. |

(Continued)

OTHER PUBLICATIONS auth0.com [online], "Interaction-Based Authentication for Alexa Skills with Auth0," Apr. 27, 2017, retrieved on Apr. 21, 2021, retrieved from URL< https://auth0.com/blog/interaction-based-auth-for-alexa-with-auth1)/>, 35 pages.
developers.onelogin.com [online], "Authenticating Alexa Skills With OneLogin," Dec. 2020, retrieved on Apr. 21, 2021, retrieved from URL<https://developers.onelogin.com/authentication/tools/alexa>, 10 pages.

(Continued)

*Primary Examiner* — Van H Oberly
(74) *Attorney, Agent, or Firm* — Fish & Richardson P.C.

(57) ABSTRACT

Techniques for searching using metadata indexing. In some implementations, a computing device receives data indicating a search request from a client device. The computing device analyzes the received data indicating the search request to determine content of the search request. The computing device receives one or more dossiers based on the content of the search query. The computing device identifies metadata and one or more index templates corresponding to each of the one or more retrieved dossiers. The computing device determines one or more matches between the data indicating the search query to the metadata and the one or more index templates corresponding to each of the one or more retrieved dossiers. The computing device generates search results that include the one or more matches based on characteristics of a type of match and weight values applied to each of the one or more matches based on the characteristics of the type of the match. The computing device provides data indicating the search results to the client device.

19 Claims, 4 Drawing Sheets

(56) References Cited

U.S. PATENT DOCUMENTS

| | | |
|---|---|---|
| 8,042,162 B2 | 10/2011 | Blakley, III et al. |
| 8,291,468 B1 | 10/2012 | Chickering |
| RE45,327 E | 1/2015 | Bowers et al. |
| 10,200,368 B2 | 2/2019 | Oberheide et al. |
| 10,268,815 B2 | 4/2019 | Dunstan |
| 2003/0163739 A1 | 8/2003 | Armington et al. |
| 2006/0167928 A1* | 7/2006 | Chakraborty ......... G06F 40/123 |
| 2009/0083232 A1 | 3/2009 | Ives et al. |
| 2010/0161503 A1* | 6/2010 | Foster ................ G06Q 10/1053 |
| | | 705/321 |
| 2015/0186381 A1* | 7/2015 | Yan ........................ G06F 16/16 |
| | | 707/728 |
| 2016/0096112 A1* | 4/2016 | Sharma ................ A63F 13/847 |
| | | 463/31 |

OTHER PUBLICATIONS tools.ietf.org [online], "Third-Party Token-based Authentication and Authorization for Session Initiation Protocol (SIP)," Nov. 19, 2019, retrieved on Apr. 21, 2021, retrieved from URL <https://tools.ietf.org/id/draft-ietf-sipcore-sip-token-authnz-06.html, >, 16 pages.

tools.ietf.org [online], "The OAuth 2.0 Authorization Framework" Oct. 2012, retrieved on Apr. 21, 2021, retrieved from URL < https://tools.ietf.org/html/rfc6749>, 77 pages.

tools.ietf.org [online], "OAuth 2.0 Token Introspection" Oct. 2015, retrieved on Apr. 12, 2021, retrieved from URL < https://tools.ietf.org/html/rfc7662>, 18 pages.

tools.ietf.org [online], "JSON Web Token (JWT)", May 2015, retrieved on Apr. 21, 2021, retrieved from URL < https://tools.ietf.org/html/rfc7519>, 31 pages.

\* cited by examiner

METADATA INDEXING

CROSS-REFERENCE TO RELATED APPLICATION

This application claims the benefit of U.S. Provisional Application No. 62/486,269, filed Apr. 17, 2017, and titled "Metadata Indexing," which is incorporated by reference.

TECHNICAL FIELD

This specification relates generally to metadata indexing.

BACKGROUND

Search engine indexing typically collects, parses, and stores data to facilitate fast and accurate information retrieval.

SUMMARY

The subject matter of the present disclosure is related to techniques for providing search results from indexed metadata in a dossier in response to a search query. A dossier can be a book-like package that allows users to compile reports, charts, tables, and other information on a particular platform. Each dossier allows users to organize relevant information for a particular audience, and to arrange the dossier in chapters that are easy to view on tablets and similar devices. In addition, each chapter of a dossier includes one or more pages with relevant information related to the content of the chapter. For example, if the chapter of a dossier relates to engineering data, each page may include information pertaining to engineering, such as drawings, specifications, standards, and fabrications of devices.

Dossiers may also include a dossier interface that allows users to interact with the data and customize the reports, e.g., by filtering data to update the reports, adding annotations, or initiating communication with other users directly from the dossier interface. Dossiers can include restrictions which may not allow other users to add data sources or substantively edit beyond the adjustments allowed by a user who created a particular dossier. Users can save and share their filters and annotations and share them with other users. Also, changes or additions to the dossier by the owner (e.g., user that publishes the dossier) are propagated through to all dossiers derived from the master version dossier.

In some implementations, the information provided in the dossiers may be indexed and stored in index templates. This can provide high accuracy for search results and robustness in making search query matching determinations. With index templates, assessing whether information in a dossier structure matches content provided in a search query can provide improved results compared to systems that do not assess dossier structure without index templates. For example, some systems that look for matching content in a dossier to determine a match may not recognize particular elements on a dossier page if abbreviations, misspellings, or different words are used, even if the documents refer to the same topics or concepts. Similarly, systems that assess document content may not correctly determine fields or portions of documents to match content in a search query. For example, it may not be clear whether a term found in a search query can be found in a dossier page. This is because the term may represent a visual object found in the dossier page, and that term may not appear on the dossier page, such as "bar chart." As discussed further below, these symptoms can be resolved by defining the documents structure in an index template. Additionally, the matching results may be ranked according to weighted values to further provide user preference in receiving search results.

The searching using metadata indexing techniques discussed herein also provides a computationally efficient technique for assessing content of a dossier page. In some implementations, query searching using metadata indexing is determined from a number of data objects matching to one or more terms found in the query. A computing system can compare the one or more terms found in the query to the data objects in each of the index templates associated with the dossier page with low computational complexity, which can allow for fast and efficient generation of dossier search results.

In one general aspect, a method is performed by one or more computers. The method includes: receiving, by the one or more computers, data indicating a search request from a client device; analyzing, by the one or more computers, the received data indicating the search request to determine content of the search request; retrieving, by the one or more computers, one or more dossiers based on the content of the search request; identifying, by the one or more computers, metadata and one or more index templates corresponding to each of the one or more retrieved dossiers; determining, by the one or more computers, one or more matches between the data indicating the search request to the metadata and the one or more index templates corresponding to each of the one or more retrieved dossiers; generating, by the one or more computers, search results that include the one or more matches ranked based on characteristics of a type of match and weight values applied to each of the one or more matches based on the characteristics of the type of the match; and providing, by the one or more computer, data indicating the search results to the mobile device.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, wherein receiving the data comprises receiving, from the client device over a network, data indicating one or more terms that describe the one or more dossiers, one or more chapters of the one or more dossiers, one or more pages of the one or more chapters, or reference information relating to the content of the one or more dossiers.

In some implementations, the method further comprises wherein retrieving the one or more dossiers based on the content of the search request further comprises: accessing, by the one or more computers, a dossier database to retrieve the one or more dossiers; and retrieving, by the one or more computers, an identifier from each of the one or more dossiers that identify each of the one or more retrieved dossiers.

In some implementations, the method further comprises wherein identifying the metadata and the one or more index templates corresponding to each of the one or more retrieved dossiers further comprises: accessing, by the one or more computers, a metadata database to retrieve the metadata corresponding to the retrieved one or more dossiers; accessing, by the one or more computers, an index template database to retrieve index templates corresponding to the retrieved one or more dossiers; and identifying, by the one or more computers, the metadata and the one or more index templates using the identifier corresponding to each of the one or more dossiers as an index in the metadata database and the index template database.

In some implementations, the method further comprises wherein the one or more index templates comprises attribute information, metric information, graph type information, user generated content, user mentions, and telemetry data that describes a page of a dossier.

In some implementations, the method further comprises wherein determining the one or more matches between the data indicating the search request to the metadata and the one or more index templates comprises: comparing, by the one or more computers, at least a portion of the search request to the attribute information, the metric information, the graph type information, the user generated content, the user mentions, and the telemetry data that describes the page of the dossier; comparing, by the one or more computers, at least the portion of the search request to the metadata; and in response to comparing at least the portion of the search request to the attribute information, the metric information, the graph type information, the user generated content, the user mentions, the telemetry data, and the metadata, determining, by the one or more computers, whether a match exists to at least the portion of the search request.

In some implementations, the method further comprises wherein generating the search results that include the one or more matches ranked based on the characteristics of the type of match and the weight values applied to each of the one or more matches based on the characteristics of the type of the match further comprises: ranking, by the one or more computers, the search results using a first match result in the one or more matches higher than a second match result in the one or more matches based on the first match result resulting from a first match between at least the portion of the search request to an attribute of a first index template and the second match result resulting from a second match between at least the portion of the search request to a metric of a second index template; applying, by the one or more computers, a first weighted value to the attribute information, a second weighted value to the metric information, a third weighted value to the graph type information, a fourth weighted value to the user generated content, and a fifth weighted value to the telemetry data; and ranking, by the one or more computers, the search results using the one or more applied weights.

In some implementations, the method further comprises wherein generating the search results comprises adjusting, by the one or more computers, the search results using telemetry data that comprises a number of page level views by one or more users, a number of comments found on each page of the one or more dossiers, whether a user is mentioned on a page of a dossier, how recent the user was mentioned on the page of the dossier, and whether the dossier is certified or uncertified.

In some implementations, the method further comprises wherein providing the data indicating the search results to the client device in the ranked order further comprises: selecting, by the one or more computers, matched dossiers to provide in the search results based on the relevance between the data indicating the search request to the metadata and the one or more index templates; and selecting, by the one or more computers, a subset number of the matched dossiers to provide in the search results based on user preference.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
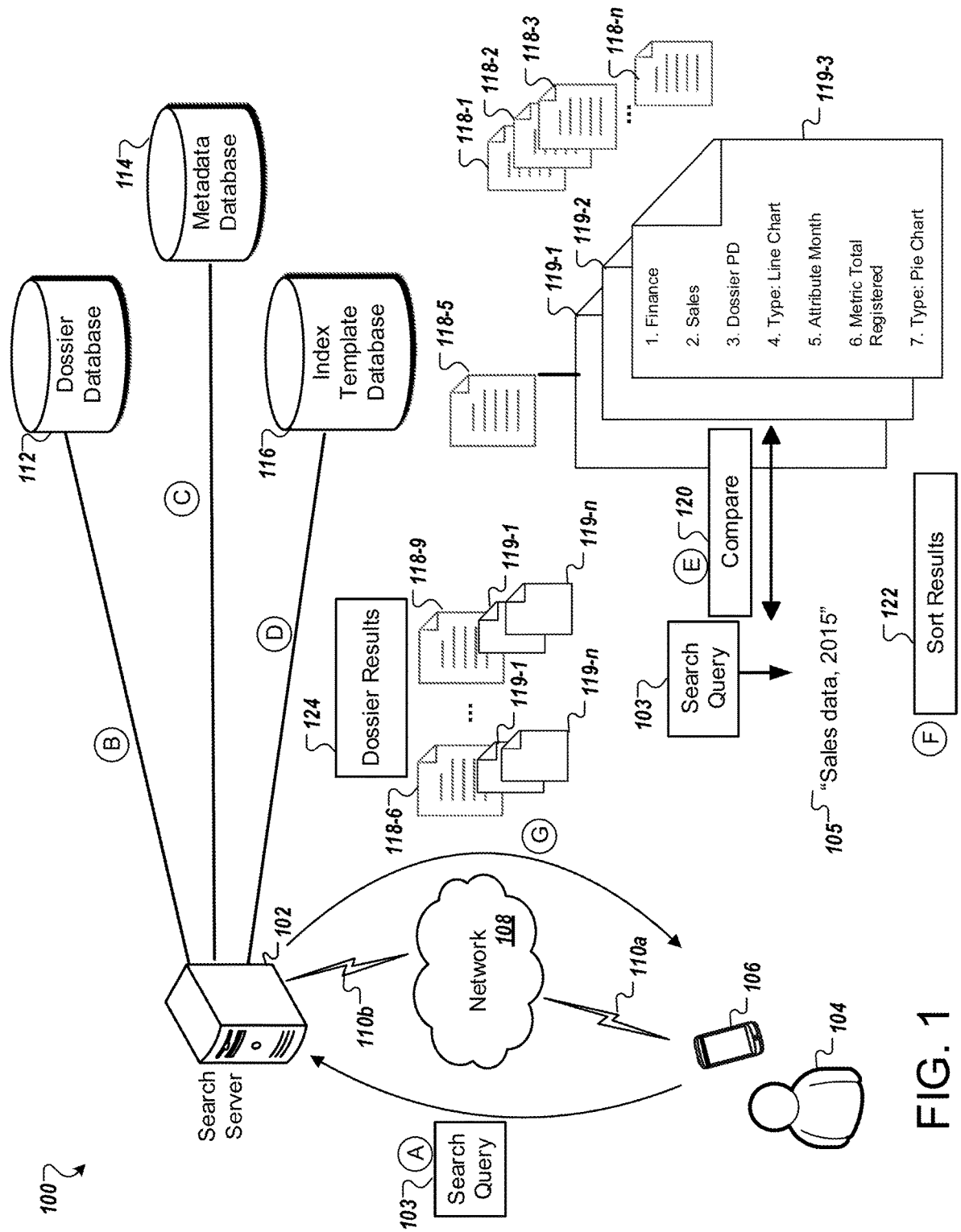
FIG. 1 is a block diagram that illustrates an example of a system for searching using metadata indexing.

FIG. 1 is a block diagram that illustrates an example of a system 100 for searching dossiers using metadata indexing. The system 100 includes a search server 102, a dossier database 112, a metadata database 114, an index template database 116, a client device 106, and a network 108. FIG. 1 illustrates various operations in stages (A) to (G) which can be performed in the sequence indicated or in another sequence.

The system 100 can be used to evaluate content of dossiers. A dossier is defined as a collection of documents or interfaces that can be distributed or shared with other users. The dossier generally includes a user-selected grouping of interfaces, such as documents, dashboard, reports, or other objects. These objects can be presented with a specified layout, formatting, or sequence defined by the creating user. These interfaces can include interactive elements, such as filters and other controls, that have behavior specified by the user that creates the dossier. In this manner, the dossier can be viewed and interacted with similar to an application. The dossier can include data connecting the elements to live data sources. For example, a dossier may include data connecting a chart, table, or map shown in a dashboard of the dossier to a data set provided by a database server. The chart, table, or map can be updated so that users can be shown the current information from the database each time they view the dossier. Of course, a dossier may include or reference a static data set, and filters or other controls may operate on the static data set. Similarly, pre-generated content elements that do not change can also be presented.

Dossiers can have a variety of characteristics. In some implementations, a dossier defines a closed set of elements or data sources. For example, a recipient of a dossier may be able to filter or manipulate data from a data set that the creating user specified, but the recipient may be restricted from adding new data sources to the dossier. Sharing a dossier may grant the recipient access to a data source for viewing and use within the dossier.

A dossier may permit a user to make a variety of changes, and may also restrict some changes to the dossier. Once a dossier is shared, different versions of the dossier may be created, each linking back to the original, master version. In some implementations, different versions are tracked and stored by a server system in association with different user accounts. As a result, a user may view, annotate, or share his own version of a dossier from multiple different devices. Local copies of dossiers may be stored, annotated, or shared, and these local copies may be synchronized with copies stored by the server system. A dossier may be closed so that recipients are restricted from changing the structure of the dossier, for example, they cannot add new interfaces, documents, or interactive elements to the dossier, although the dossier may still permit the addition of annotations or the use of controls that the creating user has included. Alternatively, a dossier has an open structure so that recipients may append additional elements such as pages, dashboards, etc.

Among the changes that users may be able to make are the addition of annotations, for example, the addition of comments, highlights, graphics, and so on. Similarly, users may be able to apply redactions or deletions. For example, a recipient of a dossier showing sales data for a region may focus a version of the dossier on only a portion of a region by reordering or deleting pages and filtering data sets to include data for a particular location in a region, so that charts and tables are updated to show the information for the particular location. The user can then pass on the annotated or modified version to other users.

A dossier may also have a state that is persistent for individual users. Current state characteristics can be stored for each user's version of the dossier, e.g., at a server and/or locally at a user device. As a result, when a user applies filter settings using a control within a dossier, those settings are retained after the dossier is closed and reopened, and will be passed on to other users if the user shares the dossier.

In some implementations, a dossier may be structured as a hierarchy or tree of objects. The dossier may have a content root node which is associated with an identifier, which will be referred to as a dossier ID. Interfaces may be defined for the dossier as, for example, chapters and pages within chapters. The content root node may include information indicating each of the document elements at the next level of the hierarchy, e.g., different chapters. In some implementations, the content root node may include data indicating the structure or the entire tree.

Different levels of a dossier hierarchy may each link to different elements of the dossier. Examples include a (i) "page node", (ii) a "filters panel stack," and a (iii) "section node." A cover page may provide an initial view or overview of a given level of the hierarchy, e.g., for the dossier as a whole or a more specific section. The "filters panel stack" represents interactive elements and their settings. Each level of the hierarchy may have associated interactive controls. Some controls, linked to the root node, may act on the entire dossier, for example, to filter a data source across all chapters and pages. These filters may be considered more of a global filter as they filter across all chapters and pages. Other controls may operate in more limited areas of the dossier, for example, on specific chapters, pages, regions of pages, or specific elements within pages. These filters may be considered local filters as the filter operates on specific elements. Thus, the behavior of controls can be defined independently for each level of the hierarchy that forms the dossier. The page node may represent a specific view or user interface. The position of page nodes in the hierarchy indicates the sequence that views are shown to the user.

In some implementations, elements of the dossier are stored as server objects, for example represented by XML code or other data structures. Each object has a unique identifier, so that the structure of the dossier can be defined by links between the objects. The overall structure of the dossier may be fixed by the user that creates the dossier. Each user that receives the dossier may have a user identifier assigned.

In some implementations, each chapter of a dossier may include links to multiple dashboards, links to data sources for each of the dashboards, and permissions that are set by the creating user. The permissions may include a list of users who can access the chapter, a list of filters that users can apply to the dashboards or data sources, or a list of the documents or items on each document that users can annotate. Each chapter may also include data related to users who interacted with the chapter. A user may add annotations to documents such as comments or highlighting. Additionally, a server may add data to the chapter to indicate that the user added a filter to the document and identifies the filter applied and the data source to which the filter applies.

In some implementations, users may want to search for particular information in system 100. For example, a user associated with a particular company has a dossier that includes sales data for that particular company during the 2016 year in the San Diego region may want to know how that particular has performed in sales in the previous years. In order for the user to learn of this information, the search may send out a search query in system 100. The search query may be a text string that includes sales data with particular filters applied, such as during the 2010-2015 period, as well as a filter for a region, such as San Diego for the particular company. The system 100 can receive the query request from the user and parse the query request to determine what search attributes are required. In response to the request, the system 100 can provide dossiers which include data, such as chapters and pages, related to the user's search request. In order for the system 100 to search through each of the dossiers, the system 100 must index the information provided in each dossier. In typical systems allowing users to search for relevant material, the system performs string matching for user typed queries on documents such as dossiers. However, a string matching search may only return matching metadata such as a dossier name, chapter name, and page name. This approach requires the user to type an exact string match for the content they are looking for and does not consider additional content included at the page level of the dossier. For example, the additional content included at the page level includes attributes, metrics, graph types, user generated content, user mentions, and telemetry data. In order for system 100 to provide a user with a more thorough search, an index template may be provided associated with each page level to provide content related to the additional content for searching.

The search server 102 can include one or more computers, and may include computers distributed across multiple geographic locations. The search server 102 communicates with one or more data storage devices that provide access to the dossier database 112, metadata database 114, and index template database 116.

The client device 106 can be, for example, a desktop computer, a laptop computer, a tablet computer, a wearable computer, a cellular phone, a smart phone, a music player, an e-book reader, a navigation system, or any other appropriate computing device. The network 108 can be wired or wireless or a combination of both, and can include the Internet.

The search server 102 can be part of an enterprise platform that allows users to search for information in dossiers related to a searchable request. The search server 102 can determine which dossiers in system 100 include data that matches content related to the searchable request.

As a result, the search server 102 can provide the dossiers that include the matching content to the user. The various data objects in each of the dossiers can be defined and made available to users. Each dossier and associated data objects can have a unique identifier in the dossier database 112. Information about the data objects may be made available to many users, for example, to users in a company or other organizations.

The metadata database 114 includes information relating to the content of each dossier. The content of each dossier may include the data associated at a chapter level and at a page level. The data included at each chapter level and page level includes the attributes, the metrics, the data shown on graphs, and user generated content such as filtered data.

To facilitate the search, the search server 102 creates and maintains an index template database 116. The index template database 116 stores an index template for each page in each dossier in the dossier database 112. Each index template includes information, such as metadata, relating to the detailed content of a page in a particular dossier. For example, the index template includes page level metadata information such as attribute information, metric information, graph type information, user generated content, user mentions, and telemetry data. The index template allows the search server 102 to search for detailed information not searchable on a page of a dossier. For example, a dossier may include searchable information such as a dossier name, a chapter name, and a page name. The index template database 116 is maintained because the search server 102 may not be able to perform string matching or query matching between a text of "bar graph" from a user's query with a bar graph object on a particular page of a dossier. Therefore, the search server 102 can scan fields of the index template associated with the particular page to determine if the page on the dossier includes a bar graph. If the search server 102 determines a match is found in the content of the index template, the search server 102 can provide the dossier and associated chapters/pages to the user. In addition, at any point when a user updates, edits, modifies a portion of a dossier, the search server 102 may update a related portion of an associated index template. For example, if a user changes a filter type from 2015 to 2014 for a bar graph on a page of a sales dossier, the search server 102 may receive a notification indicating a change to the page of the sales dossier, and update a related field of the index template associated with that page of the sales dossier. For example, the search server 102 may include a new text field and data associated with the change, such as a filter date range change, in the index template.

When a user searches for information relating to a search request in system 100, the search server 102 can search through a list of available dossiers. The search server 102 interacts with the dossier database 112 to retrieve the available dossiers, the associated metadata objects from the metadata database 114, as well as the associated index templates from the index template database 116 for searching. Specifically, the search server 102 retrieves a particular dossier from the dossier database 112, and in doing so, retrieves an identifier associated with the particular dossier. The identifier allows the search server 102 to retrieve additional information associated with that dossier from the metadata database 114 and the index template database 116. The metadata in the metadata database 114 is indexed by an identifier associated with a dossier. Additionally, the index templates in the index template database 114 is also indexed by an identifier associated with the dossier. The search server 102 scans the information retrieved from the dossier database 112, the metadata database 114, and the index template database 116 for any content corresponding to a match of a user's query. In response to a determination of a match, the search server 102 returns dossiers that include pages with the matched content to the client device 106.

During stage (A), the server 102 obtains a search query 103. For example, the client device may send data that includes a search query indicating information relative to a user. The data may indicate a particular document a user requests to view, for example, a document the user 104 selects on a user interface, a query the user enters into client device 106. The query may be a numerical identifier of a dossier, a name of a dossier, chapter, or page, a file name, a reference to a dossier such as a URL, other data that may identify a document, or data that may reference information relating to content of a dossier. For example, the query may be a text string stating "sales data during 2015." In other example, the query may be a text string stating "total number of attendees per webcasts on every Friday of 2015." In some instances, the query may include multiple elements delimited by a particular delimiter such as a comma, to indicate the return results must include a match to each of the comma delimited items. For example, the query may be a text string stating "pie chart, engineering, 2010, organization."

In the illustrated example, user 104 enters a query into client device 106. In response, the client device 106 sends data, such as search query 130, that includes an indication of information relative to user 104 to the search server 102 over the network 108. As noted above, other methods can be used to obtain the query indicating information of interest to a user. For example, the search server 102 may access a list of previously requested queries sent by user 104 and the search server 102 may identify similar documents returned, such as dossiers, the last time this search was requested.

During stage (B), the search server 102 analyzes the received search request to determine a content of the search request. For example, the search server 102 may count the number of items in the received search query 103 from the user 104 if the search request includes one or more delimiters. The search server 102 can use the count to determine a number of items to match from each page of a retrieved dossier from dossier database 112. Additionally, the search server 102 may determine characteristics of which dossiers to retrieve from the received search query 103. For example, if the received search query 103 includes the terms "sales" and/or "engineering", the search server 102 can search for dossiers in the dossier database 112 that include only sales and/or engineering data, and no other data types, such as professional development or management data.

In the illustrated example, the search server 102 identifies the content of the received search query 103. From the identified content of the received search query 103, the search server 102 accesses the dossier database 112 to retrieve each of the dossiers from the system 100. Retrieving a dossier from the dossier database 112 includes retrieving each of the chapters associated with the dossier and each of the pages included in each of the chapters. Additionally, the dossier includes an identifier, such as ID345, for example, to distinguish itself from other dossiers and allow the search server 102 to identify metadata and index template information from the metadata database 114 and the index template database 116, respectively.

During stage (C), the search server 102 accesses the metadata database 114 to retrieve metadata associated with each of the retrieved dossiers from the dossier database 112. Specifically, the search server 102 can retrieve metadata using the identifier from the retrieved dossier as an index.

The search server 102 accesses the metadata database 114 and retrieves all metadata indexed by the identifier from the dossier. For example, the search server 102 retrieves metadata, such as all attributes, metrics, and user generated content, using the dossier identifier ID345. The metadata database 114 may include stored documents or stored metadata, or the documents or stored metadata may be distributed among various devices. The metadata for a document may be stored in any of various formats, for example, as metadata with the document, as a file separate from the document, in an index of document information, or in database records.

During stage (D), the search server 102 accesses the index template database 116 to retrieve index templates associated with each of the retrieved dossiers from the dossier database 112. Specifically, the search server 102 can retrieve the index templates using the identifier from the retrieved dossier as an index. The search server 102 access the index template database 116 and retrieves all index templates by the identifier from the dossier. For example, the search server 102 retrieves index templates regarding page level information of a dossier, such as all attribute information, metric information, graph type information, user generated content, user mentions, and telemetry data, using the dossier identifier ID345. The telemetry data includes statistics regarding usage of a particular dossier by users of system 100. For example, the telemetry data includes statistic on the number of user who have view a particular dossier, how many users have shared the particular dossier to other users, how many people have commented on the dossier, and how many times a user has been mentioned in the comments of the dossier. In some implementations, users may comment on a particular dossier for the user who created the dossier and other users to view. In the comments, a user may tag another user to direct the comment towards that other user. For example, John may write a comment in Mark's dossier stating "@Mark, nice to see improved sales during 2016." Mark may receive a notification on his client device 106 that John tagged him in a comment.

During stage (E), the search server 102 determines whether at least a portion of the search query 103 matches to data found in the retrieved dossier, the associated metadata, and the associated index template. In some implementations, the search server 102 only compares the search query 103 to data found in each of the associated index templates. This comparison process can involve comparing the search query 103 to the set of components in the associated index templates 119-1 to 119-n, e.g., the attribute information, metric information, graph type information, user generated content, user mentions, and telemetry data. For example, the search server 102 may perform regular expression matching to determine if at least a portion of the search query 103 is found in any of the data in an associated index template 119-1 to 119-n. In other implementations, the search server 102 may compare the search query 103 to data found in the retrieved dossier 118-5, the associated metadata, and the associated index templates 119-1 to 119-n. In another example, the search server 102 may perform tokenization on the search query 103 and compare each token to the data in the retrieved dossier 118-5, the associated metadata, and the associated index templates 119-1 to 119-n. Tokenizing the search query 103 "sales data, 2015" splits the query into tokens—"[sales] [data] [2015]." The search server 102 may utilize tokenization to compare each word, or token, to the data in the index templates 119 to determine a match. This process may significantly increase the resolution and fidelity of a user search and allow the search server 102 to provide better results to the user.

In some implementations, the data in each of the index templates 119 may be indexed for improved searching and matching fidelity. For example, the search server 102 may index each of the attribute information, metric information, graph type information, user generated content, user mentions, and telemetry data found in each of the index templates 119. In some implementations, the search server 102 may create an inverted index structure for each of the data in the index templates 119. The inverted index structure may store a mapping of data to a particular location in memory or in a document or a set of documents in the index template database 116. The search server 102 may crawl or search through data in the inverted index structure associated with each of the index templates 119 rather than searching the data in each of the index templates 119 to allow for faster text searches. In addition, the search server 102 can determine matches and provide results to user 104 in a timelier manner by searching through data in the inverted index associated with each of the index templates 119.

During stage (F), the search server 102 may sort the results of the matches based on the type of matches found and weighted contents. In some implementations, the search server 102 may rank one match in an index template higher or lower than a match found in another index template based on a ranking of characteristics. For example, should the search server 102 match the search query 103 to an attribute of index template 119-1, that result may be sorted higher in rank than the search server 102 matching the search query 103 to a metric of index template 119-2. The search server 102 may contribute weighted values to these characteristics of the index template 119. For example, the search server 102 may contribute a weight of 1.8 to a page title, a weight of 1.7 to a visualization header, a weight of 1.6 to telemetry data, a weight 1.5 to an attribute, a weight of 1.4 to a dossier name, a weight of 1.3 to a chapter, and a weight of 0.9 to a metric. The search server 102 may provide user 104 with a set of dossiers according to these weighted values. In some implementations, the user 104 may define these weighted values according to user defined preferences. The user defined preferences instruct the search server 102 to provide search results in the order in which the user requests. In some implementations, the search server 102 may perform a technique known as boosting to further define priority of results for user 104.

In some implementations, additional information may affect the ranking of the search result. Specifically, the telemetry data and other properties of a dossier 118 may affect the ranking of the results For example, the search server 102 can use the following elements to affect the result rankings—a number of page level views by one or more users; a number of comments on each page and on each dossier; whether a user who performs the search is mentioned on a page; whether the user who performs the search has been mentioned recently on a page; whether a dossier or page suddenly spikes in a number of views; a certified dossier having a higher ranking than a non-certified dossier; a number of times a dossier has been shared; a modification of date and time of the dossier; and, a relevance of a dossier to the user, such as from the search query.

In some implementations, the telemetry data may take precedence in ranking over the weighted characteristics in determining the rank of the search results. For example, the search system 102 may rank the dossier in which a user has been mentioned on a page higher than if a user's search query 103 matches a particular metric. This may be due to the fact that the telemetry data includes information particular relevant to a user. In some implementations, the telemetry data may further enhance the ranking of the weighted characteristics in determining the rank of the search results. Rather than the telemetry data taking precedence over the weighted characteristics, the search system may rank the characteristics with higher weighted values if the search query matches a characteristic and telemetry data. For example, the search server 102 may contribute a weight of 1.8 to a page title, a weight of 1.7 to a visualization header, a weight of 1.6 to telemetry data, a weight 1.5 to an attribute, a weight of 1.4 to a dossier name, a weight of 1.3 to a chapter, and a weight of 0.9 to a metric. In the event that the search server 102 determines the search query 103 matches one of the aforementioned characteristics and at least one of the telemetry data, the search server 102 may add a weight, such as a value of 1.0, to that ranking. For example, the search server 102 may determine the search query 103 matches an attribute of an index template 119-2 of dossier 118-5, which the search server 102 contributes a weight of 1.5. Additionally, the search server 102 may determine the search query 103 matches an attribute of an index template 119-1 of dossier 118-6 and also includes a mention of the user 104 in the index template 119-1 of dossier 118-6 who created the search query 103. As a result, the search server 102 may contribute a weight of 2.5 to the index template 119-1 of dossier 118-6 and contribute of a weight of 1.5 to the index template 119-2 of dossier 118-5, therefore ranking dossier 118-6 higher than dossier 118-5 in the search results provided to user 104.

In some implementations, the search server 102 may rank portion and whole word matching with different weighted values. For example, the search server 102 may determine that a portion of the search query 103 "sales data, 2015" matches a visualization header in the page level index template 119. Specifically, the search server 102 can contribute a weight of 1.7 to the visualization match if the entire phrase "sales data, 2015" matches exactly with the visualization header. Alternatively, the search server 102 can contribute a weight of less than the maximum the visualization match, such as 1.2, if only a portion of the phrase "sales data, 2015" matches with the visualization header, such as only "sales data" or only "2015." Other weights may be assigned as defined by the search server 102. Generally, portion matching and whole word or phrase matching may also affect the ranking of the search results.

During stage (G), the search server 102 may select a subset of the matched dossiers and page level indexes based on the ranking of the documents. For example, the server 102 can select a predetermined number of documents to indicate to the client device 106, such as the 10 top-ranked documents. As additional examples, the server 102 may identify the top 1, 3, 5, or 50 highest-ranked documents.

In addition, or as an alternative, a subset of the dossiers may be selected in other ways. For example, the search server 102 may select the predetermined amount of matched dossiers from the ranking based on user preferences. For example, a user preference may specify that the top 10 dossiers to be indicated. As another example, a user preference may specify that only the top ranked matched dossier should be indicated. As another example, a user preference may specify that only matching dossiers that satisfy a predetermined threshold should be indicated.

In some implementations, the search server 102 provides data identifying the selected dossiers to the client device 106 over the network 108. The data identifying a dossier may include a document identifier, a URL or hyperlink, file name or path, or other reference to a document. The client device 106 can then display icons, hyperlinks, previews, names, or other data representing the selected documents to the user 104. For example, in response to the user 104 sending out a search query 103, a portion of the user interface can be populated with icons or other representations of the dossiers identified by the server 102. The user can then select one of the icons to view the indicated dossier. As another example, the client device 106 can store the data indicating the similar dossiers, and indicate the dossiers to the user as recommendations matching results. In some implementations, the server 102 provides the weighted values for dossiers to the client device 106, and the similar dossiers can be formatted or arranged according to the weighted values.

The subset of dossiers identified by the search results can be indicated in other ways. For example, the user 104 may perform a swipe right with his/her index finger on a display of the client device 106 when the display shows an indication that the dossier results 124 are ready for review. The client device 106 transitions the current display of the client device 106 to a display showing the selected matched dossiers and the associated weighted values. The user 104 may access each of the one or more selected dossiers on the client device 106 by selecting an indicated dossier. In other implementations, the client device 106 may display a notification, such as a message, to user 104 when the client device 102 receives the selected dossiers and the associated weighted values from the search server 102. In other implementations, the search server 102 may only provide indications of the similar dossiers to client device 106.

The operations of stages (A) to (G) illustrate a for searching dossiers using metadata indexing. The search server 102 can repeat the operations of stages (A) to (G) to determine matching dossier results (e.g., other than dossier results 124), for example, in response to a user sending another search query 103.

In some implementations, the techniques described as being performed by the search server 102 can be performed by the client device 106. For example, the client device 106 may locally store document data for a certain set of dossiers, or may acquire the information over the network 108. The client device 106 may then determine which data objects match to user 104's search query 103 and weight the search results, using the techniques discussed above. The client device 106 may also select a subset of matching dossiers in response to the search query 103, and may display that subset on a user interface.

Figure 2:
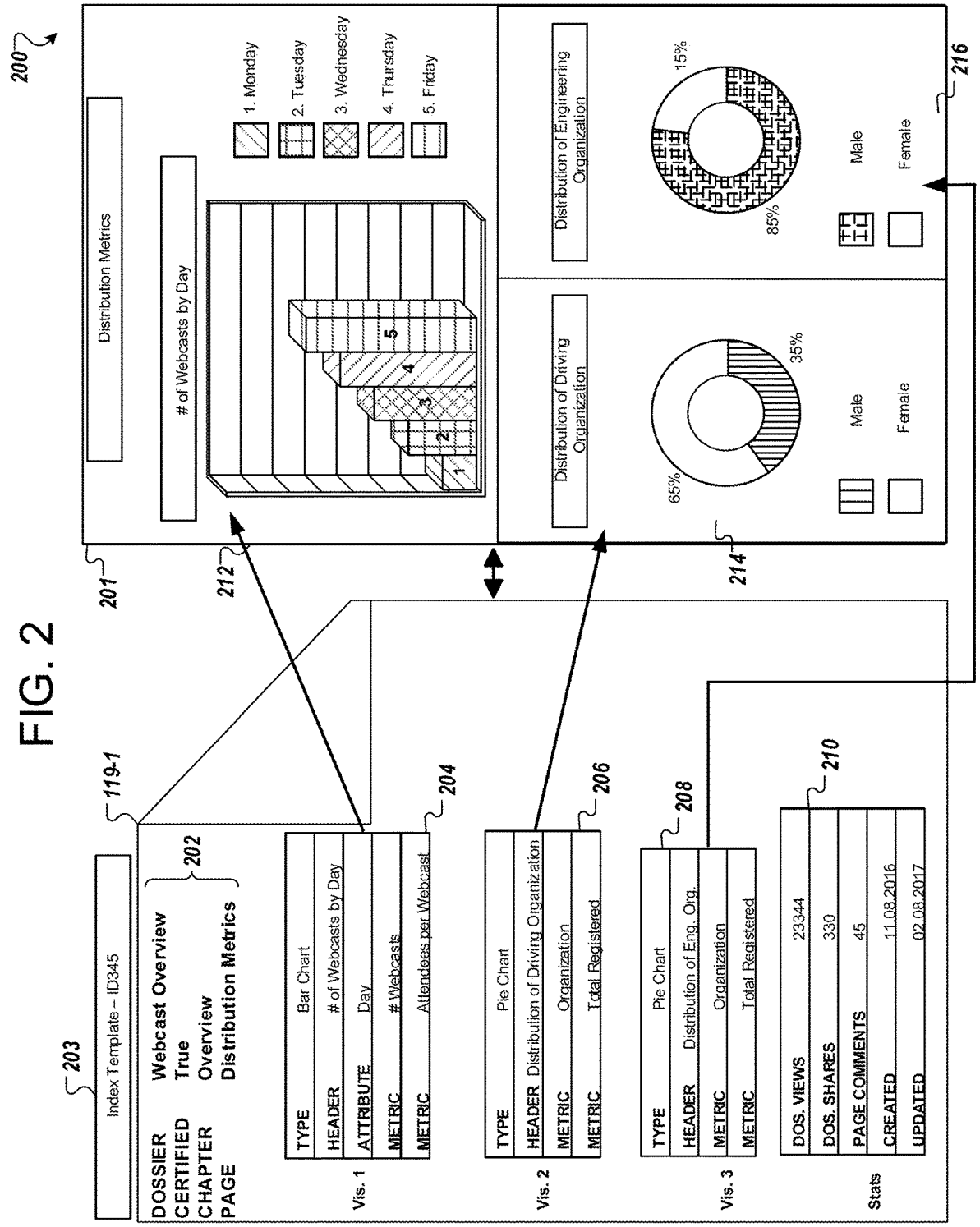
FIG. 2 is a block diagram that illustrates an example of an index template and an associated dossier page for metadata indexing.

FIG. 2 is a block diagram that illustrates an example of an index template and an associated dossier page for metadata indexing. The block diagram shows a page level index template 119-1 and an associated dossier page 201. The dossier page 201 shows visual elements 212, 214, and 216 that are part of the dossier view shown to the user on client device 106. The diagram also shows other elements in the index template 119-1, which may or may not be part of the dossier view, but are included to show how the various elements are stored in the index template to describe the dossier page 201. Additionally, all of the elements in the index template 119-1 are text searchable, which facilitate searching for particular features in the dossier page.

Each index template 119-1 and dossier has a unique object identifier. For example, the index template identifier "ID345" 203, which the search server 102 can use for storing and referencing data in the metadata database 114 and the index template database 116. In some implementations, the search server 102 may store the metric data for the # of webcasts, the metric data for the attendees per webcast, and the attribute of day associated with object 204 in the metadata database 114 indexed by the object identifier 203.

In addition, the search server 102 may store the metric data for the organization and the metric data for the total registered associated with object 206 in the metadata database 114 indexed by the object identifier 203. Likewise, the search server may store the metric data for the organization and the metric data for the total registered associated with object 208 in the metadata database 114 indexed by the object identifier 203. Additionally, the search server 102 may store the telemetry data 210 in the index template database 116 indexed by the object identifier 203.

In some implementations, all of the elements in the index template 119-1 are text searchable. The search server 102 may perform a text search through each of the dossier information 202, including the dossier type, whether the dossier is certified, the dossier chapter title, and the dossier chapter page title, to determine if the text matches the search query 103. Additionally, the search server can text search through the objects 204, 206, 208, and the telemetry data 210 to determine if any of the text matches the search query 103.

In some implementations, the dossier page 201 includes visual elements 212, 214, and 216 that display graph types and associated data content as described in the index template 119-1. For example, in the visual element 212, the dossier page 201 visually displays a bar chart, with the title of "# of Webcasts by Day", includes an attribute of a day, and includes two metrics: number of webcasts and attendees per webcast. In the bar chart, the Y-axis illustrates the number of webcasts, the X-axis illustrates the days, and the Z-axis illustrates the attendees per webcast, as defined by the width of each bar. In another example, in the visual element 214, the dossier page 201 visually displays a pie chart, with the title of "Distribution of Driving Organization", includes two metrics: an organization and the total registered. The pie chart itself diversifies the total registered between male and female, as indicated by the legend in 214. In another example, in the visual element 216, the dossier page 201 visually displays a pie chart, with the title of "Distribution of Engineering Organization", includes two metrics: an organization and the total registered. The pie chart itself diversifies the total registered between male and female, as indicated by the legend in 216.

In some instances, the dossier page 201 is interactive and dynamically updated. As an example, the data in the data set represented by the bar chart in 212 could change over time. As another example, a user may be able to define new filter parameters, e.g., by entering or selecting different parameters in the user interface. As a result, when the filter settings are changed, the result of the metric may be recomputed and the new result displayed. The document may reference the various data objects in order to facilitate these changes. For example, to generate the dossier page, the information about the different data objects may be retrieved and processed to generate the view of the document.

In some implementations, portions of the dossier page 201 may be text searched. For example, the title of the dossier page 201 "Distribution Metrics", the title of the object 204 "# of Webcasts by Day", the legend associated with object 204 indicating the different days—"1. Monday", "2. Tuesday", "3. Wednesday", "4. Thursday", "5. Friday." Additionally, titles of objects 214 and 216 "Distribution of Driving Organization" and "Distribution of Engineering Organization", respectively, and the legends associated with each of the objects 214 and 216 "Male" and "Female" may be searched. However, without the associated index template 119-1, a search request may not know that the dossier page 201 includes a pie chart, two bar charts, metadata information, and associated telemetry data 210.

Figure 3:
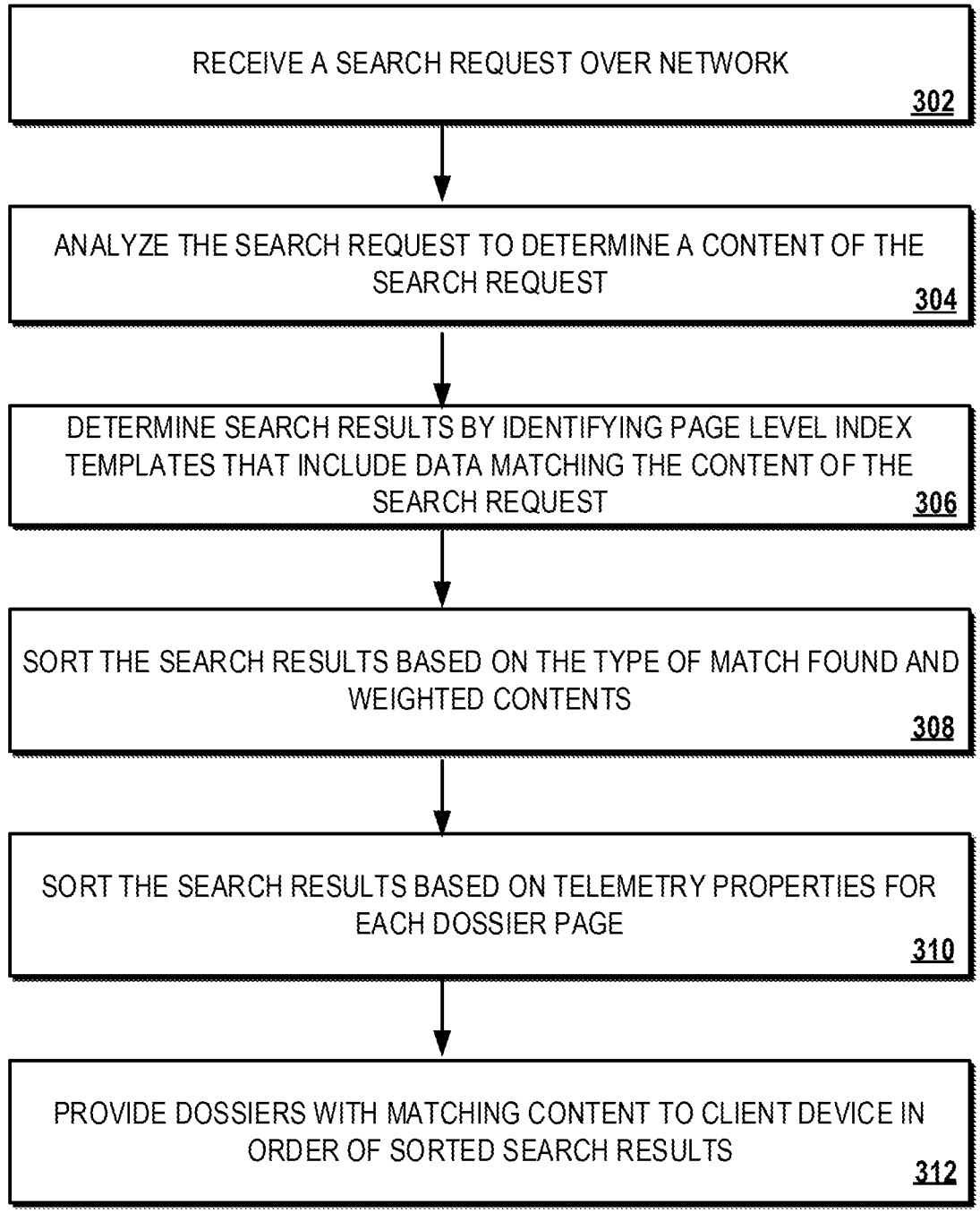
FIG. 3 is a flowchart of example processes for searching using metadata indexing.

FIG. 3 is a flow diagram of an example process 300 for searching using metadata indexing. The process can be performed by one or more computers. The process 300 is described below as being performed by the search server 102 of FIG. 1, but can be performed by any appropriate computing device or combination of computing devices.

During 302, the search server 102 may receive a search request over network 108. In some implementations, the search server 102 receives the search request, such as search request 103, from the client device 104. Typically, the search request 103 is related to data that may reference information relating to content of a dossier. As mentioned above, the information relating to content of a dossier may be page level information including attributes, metrics, graph types, user generated content, user mentions, and telemetry data. For example, a search request 103 may be a text string stating "total number of attendees per webcasts on every Friday of 2015."

During 304, the search server 102 may analyze the search request to determine a content of the search request. In some implementations, the search server 102 may count the number of items in the received search query 103 from the user 104 if the search request includes one or more delimiters. The search server 102 can use the count to determine a number of items to match from each page of a retrieved dossier from dossier database 112. Additionally, the search server 102 may determine characteristics of which dossiers to retrieve based on the content of the received search query 103. For example, if the received search query 103 includes only the term "engineering", the search server 102 can search for dossiers in the dossier database 112 that include only engineering data, and no other data types, such as professional development or financial data.

During 306, the search server 102 may determine search results by identifying page level index templates that include data matching the content of the search request. Specifically, the search server 102 determines whether at least a portion of the search query 103 matches to data found in the retrieved dossier, the associated metadata, and the associated index template. This comparison process can involve comparing the search query 103 to the set of components in the associated index templates 119-1 to 119-$n$, e.g., the attribute information, metric information, graph type information, user generated content, user mentions, and telemetry data. For example, the search server 102 may perform regular expression matching to determine if at least a portion of the search query 103 is found in any of the data in an associated index template 119-1 to 119-$n$. In some implementations, the data in each of the index templates 119 may be indexed, by a structure such as an inverted index structure. The search server 102 may crawl or search through data in the inverted index structure associated with each of the index templates 119 rather than searching the data in each of the index templates 119 to allow for faster text searches.

During 308, the search server 102 may sort the search results based on the type of match found and the weighted contents. In some implementations, the search server 102 may rank one match in an index template higher or lower than a match found in another index template based on a ranking of characteristics. For example, should the search server 102 match the search query 103 to an attribute of index template 119-1, that result may be sorted higher in rank than the search server 102 matching the search query 103 to a metric of index template 119-2. The search server 102 may contribute weighted values to these characteristics of the index template 119.

During 310, the search server 102 may sort the search results based on the telemetry properties described for each dossier page. In some implementations, the search server 102 may use the telemetry data to affect the ranking of the current search results. For example, the search system 102 may rank the dossier in which a user has been mentioned on a page higher than if a user's search query 103 matches a particular metric. This may be due to the fact that the telemetry data includes information particular relevant to a user. In some implementations, the telemetry data may further enhance the ranking of the weighted characteristics in determining the rank of the search results. Rather than the telemetry data taking precedence over the weighted characteristics, the search system may rank the characteristics with higher weighted values if the search query matches a characteristic and telemetry data.

During 312, the search server 102 provide dossiers and dossier pages with matching content to client device in order of sorted search results. In some implementations, the search server 102 may select a subset of the matched dossiers and page level indexes based on the ranking of the documents to provide to the client device 106. In some implementations, the search server 102 provides data identifying the selected dossiers to the client device 106 over the network 108 in response to the user 104 sending a search query 103.

Figure 4:
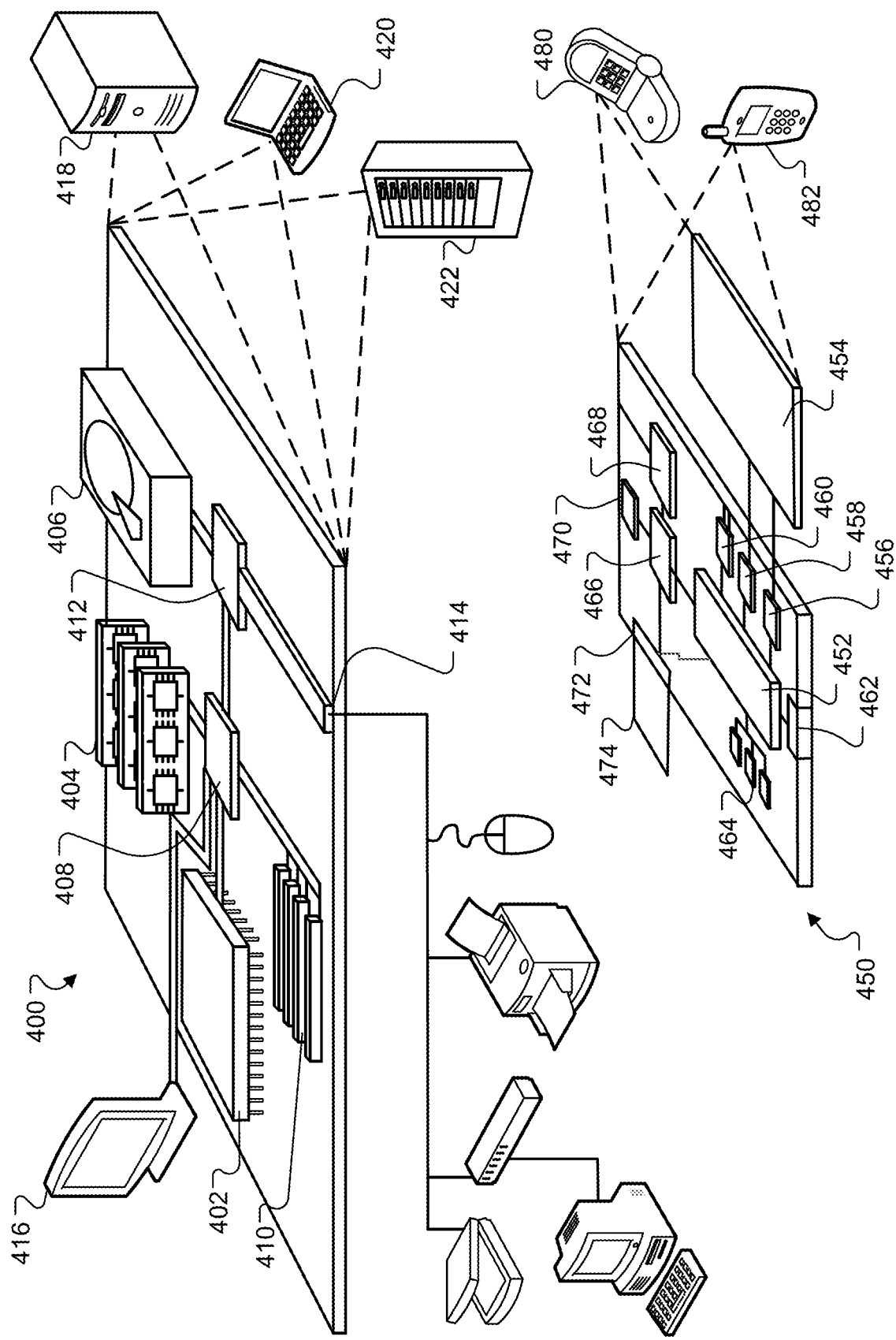
FIG. 4 shows an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 418, or multiple times in a group of such servers. In addition, it may be implemented in a personal computer such as a laptop computer 420. It may also be implemented as part of a rack server system 422. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, such that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving, by the one or more computers, data indicating a search request from a client device;
   identifying, by the one or more computers, documents based on content of the search request;
   identifying, by the one or more computers, metadata and at least one index template for each of the identified documents, wherein each index template includes information describing different types of elements of the identified document that corresponds to the index template;
   determining, by the one or more computers, one or more matches between the content of the search request and the index templates for the identified documents;
   generating, by the one or more computers, search results representing at least some of the identified documents, wherein the search results representing the identified documents are ranked based on (i) the types of elements that the index templates for the identified documents describe to have content that matches at least portions of the content of the search request and (ii) weight values corresponding to the different types of elements, wherein the weight values specify different weights for matches with different types of elements; and
   providing, by the one or more computers, data indicating the search results to the client device.

2. The method of claim 1, wherein receiving the data comprises receiving, from the client device over a network, at least one of:
   data indicating one or more terms that describe the identified documents,
   one or more chapters of the identified documents,
   one or more pages of the one or more chapters, or
   reference information relating to the content of the identified documents.

3. The method of claim 1, wherein identifying the documents based on the content of the search request further comprises:
   accessing, by the one or more computers, a document database to identify the documents; and
   retrieving, by the one or more computers, an identifier from each of the identified documents that identify each of the identified documents.

4. The method of claim 3, wherein identifying the metadata and the index templates corresponding to each of the identified documents further comprises:
   accessing, by the one or more computers, a metadata database to retrieve the metadata corresponding to the identified documents;
   accessing, by the one or more computers, an index template database to retrieve the index templates corresponding to the identified documents; and
   identifying, by the one or more computers, the metadata and the index templates using the identifier corresponding to each of the identified documents as an index in the metadata database and the index template database.

5. The method of claim 4, wherein the index templates comprises attribute information, metric information, graph type information, user generated content, user mentions, and telemetry data that describes a page of a document.

6. The method of claim 5, wherein determining the one or more matches between the data indicating the search request and the index templates comprises:
- comparing, by the one or more computers, at least a portion of the search request to the attribute information, the metric information, the graph type information, the user generated content, the user mentions, and the telemetry data that describes the page of the document;
- comparing, by the one or more computers, at least the portion of the search request to the metadata; and
- in response to comparing at least the portion of the search request to the attribute information, the metric information, the graph type information, the user generated content, the user mentions, the telemetry data, and the metadata, determining, by the one or more computers, whether a match exists to at least the portion of the search request.

7. The method of claim 1,
- wherein the index templates comprise attribute information, metric information, graph type information, user generated content, user mentions, and telemetry data that describes a page of a document, and
- wherein generating the search results representing at least some of the identified documents further comprises:
- ranking, by the one or more computers, the search results using a first match result in the one or more matches higher than a second match result in the one or more matches based on the first match result resulting from a first match between at least the portion of the search request to an attribute of a first index template and the second match result resulting from a second match between at least the portion of the search request to a metric of a second index template;
- applying, by the one or more computers, a first weighted value to the attribute information, a second weighted value to the metric information, a third weighted value to the graph type information, a fourth weighted value to the user generated content, and a fifth weighted value to the telemetry data; and
- ranking, by the one or more computers, the search results using the applied weighted values.

8. The method of claim 1, wherein generating the search results comprises adjusting, by the one or more computers, the search results using telemetry data that indicates a level of usage of the documents represented by the search results.

9. The method of claim 1, wherein providing the data indicating the search results to the client device further comprises:
- selecting, by the one or more computers, matched documents to provide in the search results based on relevance between the data indicating the search request to the metadata and the one or more index templates; and
- selecting, by the one or more computers, a subset of the matched documents to provide in the search results based on user preference.

10. The method of claim 1, wherein each of the index templates describes a structure of a corresponding identified document of the identified documents.

11. The method of claim 1, wherein a particular document of the identified documents includes a visualization, and wherein the at least one index template for the particular document indicates one or more attributes or metrics represented in the visualization.

12. The method of claim 1, wherein a particular document of the identified documents includes multiple pages, and wherein the at least one index template for the particular document comprises a different index template for each of the multiple pages.

13. The method of claim 1, wherein the different types of information included in the index templates comprise different characteristics of a document or an element included in the document.

14. The method of claim 1, wherein the index templates includes a name or description of data elements for which corresponding values are depicted in or used to generate graphical content of the document.

15. The method of claim 1, wherein one or more of the index templates for a document includes a name or description of attribute and metric used to generate a chart or graph in the document.

16. The method of claim 1, wherein the different types of elements described by the index templates include different types of data objects, and each index template describes instances of data objects in the document corresponding to the index template including the types of data objects and data elements used by the data objects.

17. A system comprising:
- one or more computers; and
- one or more computer-readable media storing instructions that, when executed by the one or more computers, cause the one or more computers to perform operations comprising:
  - receiving, by the one or more computers, data indicating a search request from a client device;
  - identifying, by the one or more computers, documents based on content of the search request;
  - identifying, by the one or more computers, metadata and at least one index template for each of the identified documents, wherein each index template includes information describing different types of elements of the identified document that corresponds to the index template;
  - determining, by the one or more computers, one or more matches between the content of the search request and the index templates for the identified documents;
  - generating, by the one or more computers, search results representing at least some of the identified documents, wherein the search results representing the identified documents are ranked based on (i) the types of elements that the index templates for the identified documents describe to have content that matches at least portions of the content of the search request and (ii) weight values corresponding to the different types of elements, wherein the weight values specify different weights for matches with different types of elements; and
  - providing, by the one or more computers, data indicating the search results to the client device.

18. The system of claim 17, wherein identifying the documents based on the content of the search request further comprises:
- accessing, by the one or more computers, a document database to retrieve identify the documents; and
- retrieving, by the one or more computers, an identifier from each of the identified documents that identify each of the identified documents.

19. One or more non-transitory computer-readable media storing instructions that, when executed by the one or more computers, cause the one or more computers to perform operations comprising:

receiving, by the one or more computers, data indicating a search request from a client device;

identifying, by the one or more computers, documents based on content of the search request;

identifying, by the one or more computers, metadata and at least one index template for each of the identified documents, wherein each index template includes information describing different types of elements of the identified document that corresponds to the index template;

determining, by the one or more computers, one or more matches between the content of the search request and the index templates for the identified documents;

generating, by the one or more computers, search results representing at least some of the identified documents, wherein the search results representing the identified documents are ranked based on (i) the types of elements that the index templates for the identified documents describe to have content that matches at least portions of the content of the search request and (ii) weight values corresponding to the different types of elements, wherein the weight values specify different weights for matches with different types of elements; and providing, by the one or more computers, data indicating the search results to the client device.

* * * * *